3,554,759
STABILIZATION OF BEER
Helmut Beschke, Frankfurt, Helmut Reinhardt, Weiss, Bezirk Cologne, and Karl Achenbach, Frankfurt, Germany, assignors to Deutsche Gold- und Silber-Scheideanstalt vormals Roessler, Frankfurt am Main, Germany
No Drawing. Filed Apr. 1, 1968, Ser. No. 717,956
Claims priority, application Germany, Apr. 4, 1967, D 52,699
Int. Cl. C12h 1/04
U.S. Cl. 99—48                    5 Claims

ABSTRACT OF THE DISCLOSURE

Beer is treated to improve its stability during storage whereby the beer is contacted with a modified finely divided silica obtained by precipitating silica from an aqueous alkali metal silicate solution with an acid in the presence of water soluble polyvinyl pyrrolidone, polyvinyl-3-methyl pyrrolidone or vinyl pyrrolidone-vinyl acetate copolymers.

BACKGROUND OF THE INVENTION

According to Chapon and Chemardin and others (EBC-Proc., Congr. 1963, 182–196), the non-biological clouding occurring in beer of poor stability consists of tannins (T) and proteins (P), for the formation of which Chapon and Chemardin gave the following reaction scheme $$P + T \rightleftharpoons PT$$

It is known that finely divided silica has a stabilizing effect on beer which can be explained essentially in that it selectively adsorbs the high molecular weight proteins which are responsible for the clouding. It furthermore is known that polyvinyl pyrrolidone can be used for beer stabilization, its activity being caused by its adsorption of polyphenolic components (tannins and anthocyanogen).

DESCRIPTION OF THE INVENTION INCLUDING PREFERRED EMBODIMENTS

According to the invention it was unexpectedly found that substantially improved stabilization of beer could be effected when a specially prepared product, containing finely divided silica and polyvinyl pyrrolidone or its derivatives, is used in place of the individual finely divided silica or polyvinyl pyrrolidone stabilizer. The product employed according to the invention is a modified finely divided silica obtained by precipitation from an aqueous silicate solution with an acid in the presence of a water soluble polyvinyl pyrrolidone or its water soluble derivatives.

The water soluble polyvinyl pyrrolidone products employed according to the invention for the modification of the finely divided precipitated silica can, in addition to water soluble polyvinyl pyrrolidone, also be water soluble polyvinyl-3-methyl-pyrrolidone and water soluble vinyl pyrrolidone-vinyl acetate copolymers. The modified silicas according to the invention are characterized by the firm incorporation of the polyvinyl pyrrolidone produced in the silica particles so that they cannot be washed out with water, acids or organic solvents.

The preparation of the modified silicas employed according to the invention is illustrated by the following examples.

(A) 200 g. of polyvinyl pyrrolidone K 30 (mol wt. about 38,000) were dissolved in an aqueous solution of 700 ml. of water glass containing 25.8 wt. percent of $SiO_2$ and 7.7 wt. percent of $Na_2O$. Then 2,050 ml. of water glass solution and 172 ml. of concentrated sulfuric acid were added gradually over a period of 95 minutes at 86° C. while stirring. Thereafter, further sulfuric acid was added gradually until a pH of 2.8 was reached. The finely divided modified precipitated silica was filtered off, washed carefully with distilled water and dried at 110° C. 1,072 g. of a finely divided silica product of the following analysis were obtained: C=6.71%, H=1.66%, N=1.21%, residue on calcination 83.37%, BET surface area 199 m.$^2$/g.

(B) 1,035 ml. of water glass solution and 102 ml. of concentrated sulfuric acid were gradually added to 11 liters of water at 50° C. in such a way that the precipitation suspension was maintained as close to a pH of 5.5 as possible. Such addition was made over a period of 30 minutes. During the first 20 minutes of such addition a solution of 40 g. of polyvinyl pyrrolidone K 25 (mol wt. about 25,000) in 500 ml. of water were also added gradually to the precipitation suspension so that the addition of the polyvinyl pyrrolidone ended 10 minutes before the addition of the sulfuric acid and water glass ended.

The resulting precipitate was filtered off, thoroughly washed and dried at 70° C. 450 g. of a modified silica product of the following analysis were obtained: C=5.45%, H=1.87%, N=1.30%, calcination residue 80.95%, BET surface area 522 m.$^2$/g.

(C) The procedure of A was repeated except that 200 g. of polyvinyl pyrrolidone K 90 (mol wt. about 75,000) were used instead of the polyvinyl pyrrolidone K 30. 1,166 g. of a modified finely divided silica product of the following analysis were obtained: C=9.64%, H=2.18%, N=1.72%, calcination residue=78.00%, BET surface area=172 m.$^2$/g.

Preferably the modified finely divided silicas employed according to the invention contain about 2% to about 15% of carbon derived from the modifying polyvinyl pyrrolidone product used.

The use of modified silicas as obtained under A, B, and C for the stabilization of beer as compared with known stabilization agents based on $SiO_2$ (D–E) and a known stabiization agent (F) on basis polyvinyl pyrrolidone is illustrated in the following example.

Example

Prior to final filtration beer was introduced into seven tanks, each of 20 liters capacity, which previously had been pressurized with $CO_2$ and allowed to stand for one day at 1° C. for quieting. Then 500 ml. of beer were withdrawn from each of six of the tanks and 20 g. of the stabilizing agent to be tested were stirred in and the mixtures were then returned to the respective tanks. The quantity of stabilizer concerned therefore was 100 g. per hectoliter of beer. After such dosages had been returned to the tanks, the tanks were mechanically moved for 15 minutes on a tumbling stand to effect good intermixing and then allowed to stand in a refrigerated space at 1° C. for 24 hours. Thereafter the beer was filtered over clarifying filters and filled into bottles, the bottles being allowed to foam over before sealing to displace air.

For comparison, the beer in the seventh tank was used as a control. No stabilizing agent was added to it, but it was otherwise processed in the same manner as the six tanks of beer to which the stabilizer was added.

The stability tests employed on the cotrol tank, and the six treated tanks, of beer was the accelerated test at 40°/0° C. disclosed by Prof. DeClerk (EBC-Proceedings, Nizza 1953, page 161).

The method of Prof. Schild, Weyh and Zurcher (Brauwissenschaft 1964, pages 289–94) was employed to ascertain the number of days the beers tested remained stable.

The following results were obtained:

| Stabilizing agents: | Number of days the beer remained stable |
|---|---|
| None (control) | 87 |
| Example A product | 295 |
| Example B product | 203 |
| Example C product | 341 |
| Example D silicic acid, commercial stabilizer with surface area of 700 m.²/gram | 170 |
| Example E silica gel, commercial stabilizer with surface area of 300 m.²/gram | 161 |
| Example F PVP based commercial stabilizer | 152 |

The substantial and unexpected superiority of the modified silicas according to the invention is clearly shown.

We claim:

1. The method of improving the stability of beer containing proteinaceous and polyphenolic substances capable of producing clouding during storage which comprises contacting such beer with a finely divided organically modified silica obtained by acid-precipitation at elevated temperatures of an aqueous alkali metal silicate solution in which a water soluble polyvinyl pyrrolidone product selected from the group consisting of water soluble polyvinyl pyrrolidone, polyvinyl-3-methyl-pyrrolidone and copolymers of vinyl pyrrolidone and vinyl acetate has been dissolved.

2. The method of claim 1, wherein the acid is added to the previously formed aqueous solution of the alkali metal silicate and polyvinyl pyrrolidone product.

3. The method of claim 1, wherein at least part of the acid is added jointly with the polyvinyl pyrrolidone product to the aqueous solution of the alkali metal silicate.

4. The method of claim 1, wherein the alkali metal silicate is water glass and the acid is sulfuric acid.

5. The method of improving the stability of beer containing proteinaceous and polyphenolic substances capable of producing clouding during storage which comprises contacting such beer with a finely divided organically modified silica obtained by precipitating an aqueous water glass solution in which a water soluble polyvinyl pyrrolidone product is dissolved, said precipitation being effected by means of sulfuric acid at elevated temperature and the said pyrrolidone product being selected from the group consisting of water soluble polyvinyl pyrrolidone, polyvinyl-3-methyl-pyrrolidone and copolymers of vinyl pyrroldidone and vinyl acetate.

References Cited

UNITED STATES PATENTS

| 3,163,537 | 12/1964 | McAdam et al | 99—48 |
| 3,424,588 | 1/1969 | Dohman et al. | 99—48 |
| 3,436,225 | 4/1969 | Raible | 99—48 |

LIONEL M. SHAPIRO, Primary Examiner

D. M. NAFF, Assistant Examiner